U S009605222B2

(12) United States Patent
Tan (10) Patent No.: US 9,605,222 B2
(45) Date of Patent: Mar. 28, 2017

(54) REACTOR (71) Applicant: Lien Chiow Tan, Singapore (SG)

(72) Inventor: Lien Chiow Tan, Singapore (SG)

(*) Notice: Subject to any disclaimer, the term of this patent is extended or adjusted under 35 U.S.C. 154(b) by 175 days.

(21) Appl. No.: 14/362,320

(22) PCT Filed: Nov. 29, 2012

(86) PCT No.: PCT/SG2012/000450
§ 371 (c)(1),
(2) Date: Jun. 2, 2014

(87) PCT Pub. No.: WO2013/081553
PCT Pub. Date: Jun. 6, 2013

(65) Prior Publication Data
US 2015/0040565 A1   Feb. 12, 2015

(30) Foreign Application Priority Data

Dec. 2, 2011  (SG) .................................. 201108938
Jul. 30, 2012  (SG) .................................. 201205660

(51) Int. Cl.
*C10J 3/86*   (2006.01)
*F01K 25/00*   (2006.01)
(Continued)

(52) U.S. Cl.
CPC ........ *C10J 3/86* (2013.01); *C01B 3/22* (2013.01); *C10J 3/00* (2013.01); *C10J 3/18* (2013.01);
(Continued)

(58) Field of Classification Search
CPC ............ C10J 2300/1671; C10J 2200/09; C10J 2300/092; C10J 2300/1215;
(Continued)

(56) References Cited

U.S. PATENT DOCUMENTS 3,999,089  A  * 12/1976  Barros ...................... C25B 1/04
310/11
2006/0029893 A1 *  2/2006  Hsu .......................... C25B 1/04
431/2
(Continued)

FOREIGN PATENT DOCUMENTS

WO   2010/151157 A1   12/2010

OTHER PUBLICATIONS

ISR/KR, International Search Report issued on Mar. 29, 2013, issued in International Application No. PCT/SG2012/000450, total 3 pages.

*Primary Examiner* — Hoang Nguyen
(74) *Attorney, Agent, or Firm* — Masuvalley & Partners (57) ABSTRACT The present application provides a reactor for: converting feedstock material into gases; or disassociating or reforming a chemical compound; and/a a mixture to its constituent elements; and/to other chemical forms, and; finally a heating device. The reactor comprises a heating device for discharging an ionized gas into the reactor, a feedstock feeder for injecting the feedstock material into the reactor, and a shell forming a chamber that encloses a portion of the heating device and a portion of the feedstock feeder. The application also provides a method for converting hydrocarbon material into synthetic gases. The method comprises: providing the hydrocarbon material to a burner inserted into a reactor, a second step of supplying ionized gases into the reactor, and a third step of subjecting the burner to a flame of the ionized gases such that molecules of the hydrocarbon material are dissociated to forming synthetic gas.

26 Claims, 3 Drawing Sheets (51) Int. Cl.
  *C10J 3/00* (2006.01)
  *C10J 3/30* (2006.01)
  *C10J 3/50* (2006.01)
  *C01B 3/22* (2006.01)
  *C10J 3/18* (2006.01)
  *C25B 1/04* (2006.01)
  *C10J 3/72* (2006.01)
  *C10J 3/74* (2006.01)

(52) U.S. Cl.
  CPC ............ *C10J 3/30* (2013.01); *C10J 3/506* (2013.01); *C10J 3/723* (2013.01); *C10J 3/74* (2013.01); *C25B 1/04* (2013.01); *F01K 25/00* (2013.01); *C01B 2203/0266* (2013.01); *C01B 2203/06* (2013.01); *C01B 2203/0822* (2013.01); *C10J 2200/09* (2013.01); *C10J 2200/158* (2013.01); *C10J 2300/092* (2013.01); *C10J 2300/0916* (2013.01); *C10J 2300/0946* (2013.01); *C10J 2300/1215* (2013.01); *C10J 2300/1223* (2013.01); *C10J 2300/1238* (2013.01); *C10J 2300/1606* (2013.01); *C10J 2300/1671* (2013.01); *C10J 2300/1823* (2013.01); *Y02E 60/366* (2013.01); *Y02P 20/128* (2015.11)

(58) Field of Classification Search
  CPC ........ C10J 2300/1823; C10J 2300/1606; C10J 3/74; C10J 2300/1238; C10J 2300/1223; C10J 2300/0916; C10J 2300/0946; C10J 2200/158; C10J 3/86; C10J 3/723; C10J 3/18; C10J 3/506; C10J 3/30; C10J 3/00; F01K 25/00; C25B 1/04; C01B 3/22; C01B 2203/06; C01B 2203/0822; C01B 2203/0266; Y02P 20/128
  USPC ................ 60/670, 682; 48/89, 111, 197 FM; 204/274
  See application file for complete search history.

(56) References Cited

U.S. PATENT DOCUMENTS

| | | | | |
|---|---|---|---|---|
| 2008/0222956 | A1* | 9/2008 | Tsangaris | C10J 3/005 48/77 |
| 2008/0277265 | A1* | 11/2008 | Tsangaris | C10J 3/24 204/157.15 |
| 2009/0020456 | A1* | 1/2009 | Tsangaris | C10G 2/30 208/133 |
| 2010/0049417 | A1* | 2/2010 | Bailey | C25B 1/04 701/100 |
| 2011/0008736 | A1* | 1/2011 | Arai | B01F 3/0807 431/8 |
| 2011/0036014 | A1* | 2/2011 | Tsangaris | C01B 3/22 48/62 R |

* cited by examiner

REACTOR

This application is a national phase application under 35 U.S.C. §371 of International Application Serial No. PCT/SG2012/000450 filed on Nov. 29, 2012, and claims the priority under 35 U.S.C. §119 to Singapore Patent Application No. 201108938-0, filed on Dec. 2, 2011 and Singapore Patent Application No. 201205660-2, filed on Jul. 30, 2012, which are hereby expressly incorporated by reference in their entirety for all purposes.

FIELD OF THE INVENTION

The present application relates to a reactor. It also relates to methods of making, installing, assembling, disassembling and using the reactor.

BACKGROUND OF THE INVENTION

Traditional power generation, either in large or small scales, usually occurs in the forms of burning fossil fuels, such as coal, natural gas and petroleum. These methods typically cause environmental pollution. For example, an Internal Combustion Engine using the petroleum normally releases particulate matters, nitrogen oxides, carbon dioxide, sulfur monoxide and sulfur oxides into the air, which are toxic to human and animals. Although nuclear power plants generate about 13~14% of the world's electricity at present, many organizations (e.g. Green Peace International) and individuals believe that nuclear power poses threats to people and environment. Alternative sources, including various forms of renewable energy, generally face the problem of high cost and poor efficiency. Technologies for power generation with high efficiency, less pollution and low cost are much desired.

SUMMARY OF THE INVENTION

A first aspect of the present invention provides a reactor for converting or reforming a feedstock material into gases or dissociating the feedstock material into its constituent elements/molecules (e.g. gas or powder). The feedstock material includes various types of natural or synthetic materials from ecosystem or factories. For example, the feedstock material includes hydrocarbon material of an organic mixture such as human waste, manure, forestry products, agricultural products, and other biodegradable materials. The feedstock material also includes hydrocarbon of non-organic types, having hydrogen or carbon, such as plastics, ammonia, water and hydrogen sulfide. The reactor is further configured to disassociate some chemical waste materials (e.g. hydrogen sulfide $H_2S$) into hydrogen gas ($H_2$) and sulfide powder (S).

The reactor comprises a heating device for discharging an ionized gas or ionized gases into the reactor, a feedstock feeder for injecting the feedstock material into the reactor, and a shell housing forming a chamber that encloses one or more parts of the heating device, and one or more portion of the feedstock feeder inside the chamber. The heating device can provide an initial source of heat for ignition or burning. Often, the heating device is automatically regulated for operation.

The feedstock material is configured to be disassociated into synthetic gas or particles by flames of the ionized gas. Under a temperature above 2,200° C., the feedstock material, either in a mixture or a single substance form, is split into elemental molecules in forming the synthetic gas, such as carbon monoxide (CO), carbon dioxide ($CO_2$), hydrogen gas ($H_2$) and CH (e.g. Methane).

The heating device is configured to be kept electrically neutral for dissociating the feedstock material. In other words, the heating device neither passes electric currents between its components for ionizing gases, nor discharges electric currents to surroundings (e.g. ambient gases) such that corrosion of the heating device is avoided or minimized. No parts of the heating device is subjected to high voltage or electric current such that the heating device becomes inert to its ambient, in contrast to electrically charged metal parts surrounded by plasma, which occurs in a plasma torch. Life span of the heating device is much extended; whilst the reactor also has low operation cost and requires less maintenance.

Since the high temperature is generated by the ionized gas(es), no extensive electric field of high voltage is applied inside the reactor. No electrode is exposed to high voltage such that both the heating device and the portion of feedstock feeder (e.g. burner) are not eroded easily. Hence, components inside reactors, including the heating device and the feedstock feeder, can have a prolonged life span for durable operation with stable performance. Inside the reactor, since the feedstock material is disassociated under the high temperature in a limited supply of oxygen, the synthetic gas can be discharged out of the reactor for other applications, such as providing fuel to a boiler. The reactor may produce carbon dioxide gas ($CO_2$), which is carbon neutral as its carbon source is not from fossil fuels. The synthetic gas offers a useful source of energy, which is environmental friendly. When waste material is used as feedstock to the reactor, the waste material is eliminated, which no longer cause pollution to the environment.

The feedstock feeder comprises a burner (i.e. first burner) hermetically inserted into the chamber, such that the reactor may be operated at a positive pressure (i.e. internal pressure higher than ambient pressure), a negative pressure (i.e. internal pressure lower than ambient pressure) or an ambient pressure. Alternatively, the burner may be inserted into the chamber without the hermetic sealing. One or more components of the burner are made of a material for withstanding high temperature (i.e. above 1,000° C. Degree Celsius). The robust material prevents the burner from being destroyed or deformed for durable and long-lasting operation. For example, the burner can be made of a ceramic material, a metal or a composite material, such as silicon carbide, tungsten, tungsten carbide, tantalum, tantalum carbide, tantalum hafnium carbide, hafnium carbide.

The burner may comprise internal, external or both types of channels for feeding the feedstock material into the chamber. These channels have predetermined sizes for feeding the feedstock material into the reactor at predetermined flow rates. For example, the burner can have eight channels and each of these channels has a diameter of 0.5 mm (millimeters) for feeding the feedstock material at 1.5 liter per minute. The feedstock material can cool down the burner in the progress of feeding through the channels.

The one or more components of the burner may include an electrically conductive material such that the ionized gas can raise temperature of the burner markedly when touching the burner with its ionized flames. For example, the burner can be entirely made of Tungsten material whose melting temperature is about 3,422° C.

The one or more components of the burner can be placed adjacent to the heating device such that the flames of the ionized gases are configured to touch the burner for disassociating the feedstock material. The burner can be elevated to a temperature above 1,000° C. for burners of steel material, 2,200° C. for burners of ceramic materials, or 3000° C. for burners of tungsten material such that the feedstock material passing through the burner is exposed to the high temperature and may be disassociated into the synthetic gas. More advantageously, since the burner and the heating device are placed in close proximity, flames of the heat device can easily wrap around exterior surfaces of the burner such that the burner may be uniformly heated up quickly.

The burner can alternatively comprise an Archimedean screw feeder and a feedstock propeller coupled together for injecting the feedstock material into the reactor. The Archimedean feeder provides an efficient feeding mechanism for supplying the feedstock material into the reactor. Feeding rates of the Archimedean feeder can easily be regulated by adjusting a rotation speed of a feeding screw of the Archimedean feeder. When required, the feeding screw can be replaced for changing a pitch distance (channel size) between its neighboring teeth and the depth of the teeth. Hence, the Archimedean screw feeder can be adapted to feed the feedstock material with different particle content/size, water content of various viscosities as well as gaseous. The Archimedean screw feeder may be replaced by other similar means for propelling the feedstock material, such as a slurry pump.

The Archimedean screw feeder comprises a replaceable feeding screw fitted inside a feeding sleeve for propelling the feedstock material between neighboring teeth of the feeding screw. The feeding sleeve may tightly enclose the replaceable feeding screw such that the feedstock material can be completely blocked from entering the reactor when the replaceable feeding screw is held standstill. In other words, the Archimedean screw feeder can also operate as a valve for regulating the flow rate of the feedstock material. Alternatively, either the feeding sleeve, or both the feeding sleeve and feeding screw have teeth such that the feedstock materials can be propelled by the teeth.

Similarly, one other method is using a tube with inner threads embraced the burner or another method, the burner has inner or outer or both threads embraced by inner or and outer tubing. The tube with threads or the burner with threads turns by a first motor and the feedstock material is fed to the burner. A second motor rotates the burner back & forth (rocks) to prevent over burning if tube with thread is used. It is possible to use a motor to rock the HHO supply tube and thus the flame rocks and the burner remains still if the tube with thread is used. If the burner has thread, then it will be continuously rotated by a motor and HHO flame can be stationary.

The Archimedean screw feeder and the feedstock propeller may be supported on a wall bracket bearing and a screw bearing respectively for rotating the feeding sleeve, the feeding screw, or both. The bearings permit relatively easy rotation between the Archimedean screw feeder and the feeding sleeve.

The shell can comprise or incorporate a heat exchanger that is connected to a portion of the shell for cooling the shell. The heat exchanger can be a shell and tube heat exchanger, a plate heat exchanger, a plate and shell heat exchanger, a plate fin heat exchanger, or other types of heat exchangers. In an embodiment, the heat exchanger has fins on an exterior surface of the shell such that a refrigerant or coolant flowing over the fins can extract heat away from the shell. The shell is kept at a low temperature (e.g. below about 100° C.) for achieving stable operation of the reactor.

The reactor may further comprise a slag collector at a bottom side of the reactor for collecting and disposing solid waste (e.g. dust/powder collection). When adopting organic waste mixture as the feedstock material, some elements of the mixture may form a mixture of metal oxides and silicon dioxide. However, the slag can also contain metal sulfides and metal atoms in the elemental form. The slag is discharged periodically out of the reactor during a continuous operation of the reactor. The slag can be used as construction material or industrial raw material.

The shell may seal the chamber hermetically such that the reactor is configured to operate at negative pressure. Under the negative pressure, since a chamber of the reactor has a lower pressure than its ambient, the ionized gases can easily flow into the reactor without the danger of causing backlash to an ionized gas generator (e.g. HHO gas generator). Alternatively, the reactor can be operated positive pressure such that the pressure inside the chamber is higher than the ambient pressure of the reactor, and the synthetic gas can be easily discharged, collected or burnt at a vent of the reactor for pressure relief. The shell may be open to ambient such that the reactor can operate at ambient pressure (e.g. atmospheric pressure).

In a preferred embodiment, the reactor further comprises a regulator connect to one or more of the feedstock feeder, the heating device and an exhaust (i.e. an inlet of a gas separator) for controlling molecular disassociation process in the chamber. The regulator includes one or more microprocessors that coordinate the feedstock feeder, the heating device and the exhaust automatically. In one embodiment, the regulator is an industrial computer, which is installed with computer software programs for operating the reactor automatically.

The regulator may be connected to one or more temperature sensors inside the chamber or on the shell for monitoring an internal temperature of the reactor. The temperature sensors check temperatures at various positions of the reactor such that the shell can be cooled down, whilst the feedstock material can be disassociated at the high temperature constantly.

The regulator is connected to a feeding valve, a pump or other control/propelling devices on a feeding tube of the feedstock feeder for adjusting flow rate of the feedstock material. The feedstock material may have different proportions of organic content and water content depending variations of the feedstock material. The flow rate of the feedstock material is coordinated with the supply of the ionized gas for controlling disassociation rates of the feedstock material and the production volume of the synthetic gas. The feeding valve may be electrically controlled, having a non-return valve or both. The feedstock feeder may further comprise an electrically controlled pump for pressurizing the feedstock material for feeding. The feeding valve may be replaced by a pump, or other regulating means.

The regulator may be connected to a discharging valve, a vacuum pump, or suction pump for the exhaust for governing flow rate of the synthetic gas. The exhaust adjusts the output of the synthetic gas such that the synthetic gas burning rate or storage of the synthetic gas is coordinated with the dissociation process of the feedstock material. In short, all processes of the reactor are brought under the control of the regulator for complete automation.

The present application can provide a gasification device that comprises the reactor and an HHO gas generator. The HHO gas generator is connected to the heating device for supplying the ionized gases. The ionized gases comprise oxygen gas, hydrogen gas and free ions of oxygen and hydrogen molecules ($O_2$, $H_2$, $O^{-2}$, $H^+$, $HO^-$). In contrast to pure oxygen and hydrogen gases (no electrical charge), the ionized gases can be burnt at a much higher temperature of more than 2,200° C., which is sufficient for disassociating the hydrocarbon material into the synthetic gas. In one preferred embodiment, the ionized oxygen and hydrogen gases (i.e. HHO gas or oxyhydrogen gas) is generated by an electrolysis process in water solution of potassium hydroxide. The potassium hydroxide solution may be replaced by water. Electrodes for conducting the electrolysis process may be charged with continuous supply of constant voltage (e.g. DC) or pulsating direct current.

The HHO gas generator can further comprise a water tank. The water tank comprises a liquid orifice for receiving water in liquid or gas form, and a gas orifice for releasing the ionized gas. The water tank is connected to reactor such that water from the reactor is received by the water tank for generating the ionized gas, whilst the ionized gas is supplied to the heating device of the reactor. Various parts of the gasification device interact and operate together in a regulated manner.

The HHO gas generator can further comprise a Direct Current (DC) power supply for supplying an electric current to an anode and a cathode in the water tank. Outputs (e.g. voltage and current) of the DC power supply may be connected to the regulator for regulating production rate of the ionized HHO gas (i.e. oxyhydrogen gas). Any of the anode and cathode can be in the form of parallel metal plates dipped or immersed inside the water solution. The water tank may have a water level indicator or sensor, which is further connected to the regulator for controlling water level inside the water tank.

The gasification device can further comprise a pressurized gas loop optionally having a reactor portion that is connected to the reactor for absorbing heat from the reactor. The pressurized gas loop contains a working fluid (i.e. refrigerant) that is configured to be circulated around the reactor (e.g. shell) and inside the pressurized gas loop. The working fluid includes chlorofluorocarbons, ammonia, sulfur dioxide, carbon dioxide, water and non-halogenated hydrocarbons (e.g. propane). The pressurized gas loop can utilize phase change of the refrigerant for extracting heat from the reactor effectively. The refrigerant inside the pressurized gas loop is circulated around the repeatedly under a predetermined pressure. In particular, the predetermined pressure is adjustable for regulating heat transfer efficiency.

The pressurized gas loop can comprise a pressure-to-motion device for outputting mechanical movement, electricity or both. The pressure-to-motion device converts pressure difference between its inlet and outlet to mechanical motion, such as linear translation or rotary movement. For example, the pressure-to-motion device is a piston engine (i.e. reciprocating engine) that converts the pressure difference into a rotating motion. Alternatively, the pressure-to-motion device is a turbine or its variations for providing rotary motion of high speed (e.g. at 1,000 rpm).

The pressurized gas loop can further comprise a compressor for increasing pressure of the refrigerant. For example, the refrigerant is converted from gas to liquid phase by the elevation of pressure. Temperature change can also occur after the pressure or phase change. Since the heat exchanger on the shell can operate as an evaporator/boiler, the compressor and the heat exchanger can work together for extracting heat from the reactor via the phase change of the refrigerant, which is effective and efficient.

The pressurized gas loop can further comprise a heating portion for heating the refrigerant before entering the pressure-to-motion device. For example the heating portion can be exposed to flame of the synthetic gas for raising temperature of the refrigerant at a downstream of the pressurized gas loop. Pressure of refrigerant is further increased for propelling the pressure-to-motion device faster.

The gasification device may further comprise a hydrogen gas circulation loop for receiving, collecting and converting the hydrogen gas to heat, water, or both. The hydrogen gas is a part of the synthetic gas, which comes from the reactor. The hydrogen gas loop may also transport other types of synthetic gas, such as carbon monoxide gas (CO). The hydrogen gas loop takes exhaust gas of the reactor for heating the refrigerant such that the pressure-to-motion device can generate more energy, such as electricity. In an alternative, the hydrogen gas may be collected for powering a hydrogen fuel cell or for other industrial use.

The hydrogen gas circulation loop may comprise a gas separator (e.g. scrubber) connecting to the reactor for separating the hydrogen gas from the synthetic gas. For example, in a scrubber, a mixture of hydrogen gas ($H_2$) and carbon dioxide gas ($CO_2$) may be separated by pressurizing the mixture at 5.2 Bar such that the carbon dioxide ($CO_2$) becomes liquid for draining away from the hydrogen gas ($H_2$).

The hydrogen gas circulation loop may further comprise a hydrogen torch which is connected to a hydrogen upstream tube on the gas separator for heating a heating portion of the pressurized gas loop. The hydrogen torch can also burn the synthetic gas of other types, such as carbon monoxide gas. Both the hydrogen torch and the heating portion may be enclosed or surrounded by a case or enclosure for avoiding leakage of the synthetic gas.

The hydrogen gas circulation loop can further comprise a liquid pump connected to a hydrogen burning chamber of the hydrogen gas circulation loop for circulating water to the water tank. The liquid pump can accelerate the water circulation and/or propel the water to a high level. Hence the components of the gasification device can be more flexibly arranged vertically for providing a compact apparatus.

The present application also provides an engine for providing electricity or propulsion. The engine comprises the gasification device and an electricity converter connected to the pressure-to-motion device, the power supply, or both. The pressure-to-motion device of the gasification device provides mechanical driving force (e.g. torque) by disassociating the hydrocarbon material into the synthetic gas. The synthetic gas may also be supplied as a fuel, either for pressurizing the working fluid of the pressurized gas loop, or for causing piston motion in an Internal Combustion Engine (ICE). The engine can either be installed in a building for supplying electricity to a household, on board for driving a vehicle.

The present application moreover provides a powertrain for providing locomotion to a vehicle. The powertrain comprises the engine and a transmission connected to the engine. The transmission includes a gearbox, a belt transmission, a chain drive or a combination of any of these. The powertrain delivers motions of related speed and amount to wheels or propellers of the vehicle. The powertrain may alternatively drive an electricity generator for charging an onboard battery of an electric vehicle.

In the application, the heat exchanger may comprise a filtration system for removing impurities from the pressurized gas loop, which is beneficial for maintaining the pressurized gas loop. Particular, the heat exchanger may comprise a condenser that can covert the working fluid from gas phase to liquid phase. Hence, the working fluid can be repeatedly converted between the gas phase and the liquid phase inside the pressurized gas loop for efficient heat transfer.

Another aspect of the present application provides a method for converting or reforming a feedstock material (e.g. hydrocarbon material) into synthetic gas. The method comprises a first step of providing the feedstock material to a burner inserted into a reactor, a second step of supplying ionized gasses into the reactor, and a third step of subjecting the burner to a flame of the ionized gases such that molecules of the feedstock material are dissociated in forming the synthetic gas, basic element or compound. The three steps of operation may be coordinated by a regulator (e.g. industrial computer), which adjusts temperature, flow rate and pressure, at various positions automatically and continuously. The method can be implemented by a large factory or by a compact apparatus onboard a vehicle. The feedstock material may be replaced by an organic mixture in liquid or gas phase.

The step of providing the feedstock material or mixture can comprise a step of pulverizing or grinding a feedstock material/mixture into powder or fluid form for feeding through channels inside the burner. Feedstock material in powder form can be more effectively exposed to a high temperature environment for speedy disassociation.

The step of providing the feedstock mixture or material may comprise a step of squeezing the feedstock material through the channels. Under pressure, the feedstock material can be uniformly injected into the reactor with a predetermined rate, which is useful for controlling the rate of synthetic gas generation.

The step of supplying ionized gases can comprise a step of delivering a direct electric current through an ionic substance via an anode and a cathode. In an electrolysis operation, the anode and cathode receive positive and negative charges, whilst the rate of HHO gas generation can be controlled by regulating the voltage, current and pattern of charge (e.g. pulsation) of the direct current. The step of supplying the ionized gas may also be achieved by passing an electric current (e.g. direct current) through water, or water with an electrolyte.

The step of supplying ionized gases may further comprise step of igniting the ionized gases for generating the flame above 600° C., 1,000° C. or 3,000° C. The ignition may be automatically provided by a piezoelectric lighter or a spark plug such that the disassociation process of the feedstock material can be initiated automatically.

The step of supplying ionized gases can further comprise step of causing the flame to touch the burner for heating up the feedstock mixture. The flame may enwrap the burner such that the burner can be raised to an extreme temperature (e.g. above 2,200° C.), or even higher. The burner may rotate or move linearly such that different parts of the burner can be sequentially touched by the flame, whilst localized heating is avoided for preventing melted down of the burner.

The step of providing the hydrocarbon or compound or singular or plural element material may comprise a step of propelling the material between neighboring teeth of an Archimedean screw feeder. A thread of the Archimedean screw feeder can propel the material under regulated speed, whilst cooling the burner. Whilst the material is gaseous, it may just flow by the narrow the gap of space to a lower pressure zone.

The step of subjecting the burner to the flame can comprise a step of shifting a feeding sleeve of the Archimedean screw feeder under the flames. The shifting action may be carried out by an electric motor connected via a gear transmission. The feeding sleeve can be moved during the process of disassociating the compound material or transferring heat to material that flows through.

BRIEF DESCRIPTION OF THE DRAWINGS

The accompanying figures (FIGS.) illustrate embodiments and serve to explain principles of the disclosed embodiments. It is to be understood, however, that these figures are presented for purposes of illustration only, and not for defining limits of relevant applications.

DETAILED DESCRIPTION OF THE PREFERRED EMBODIMENTS

Exemplary, non-limiting embodiments of the present application will now be described with references to the above-mentioned figures.

Figure 1:
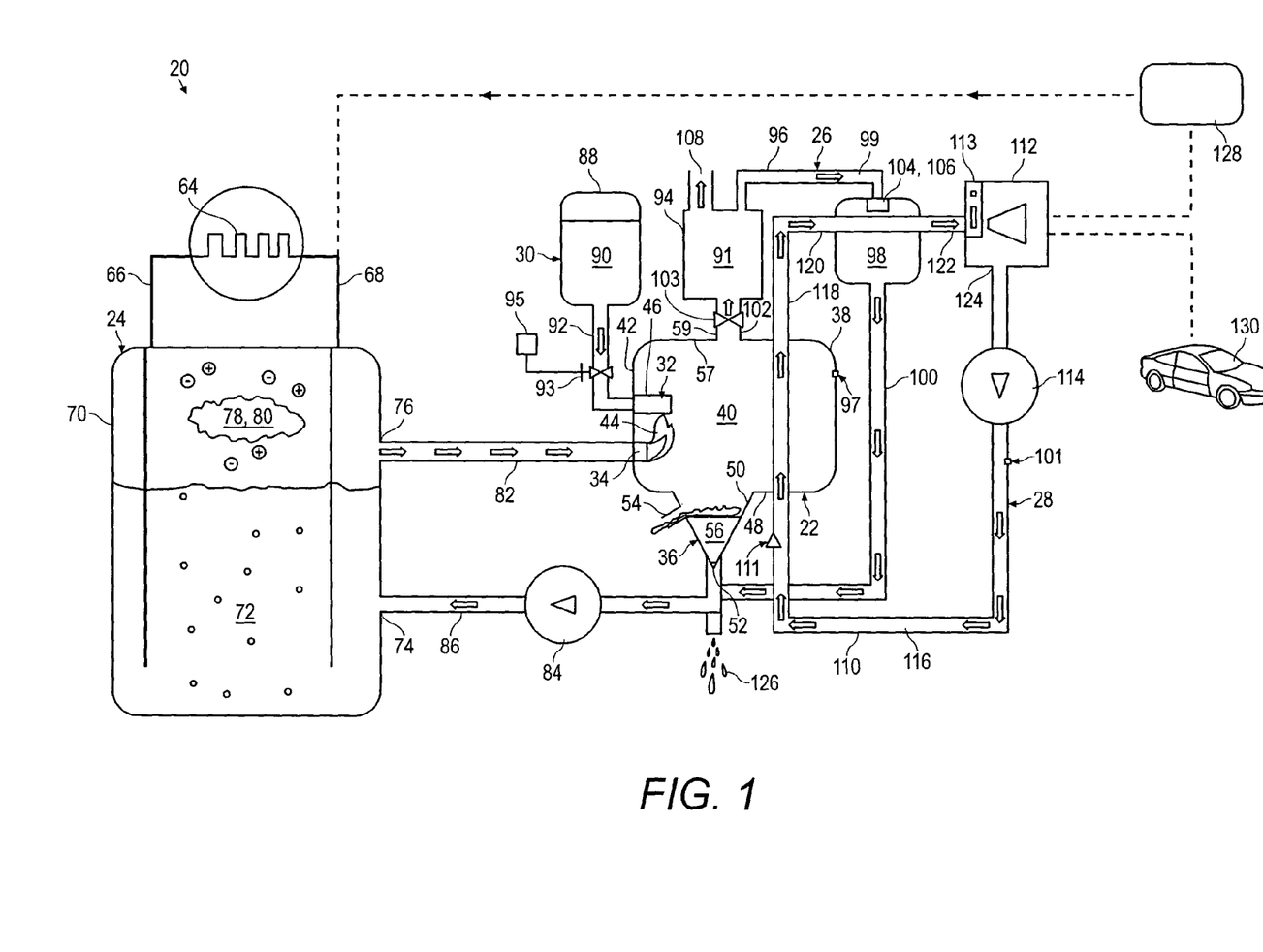
FIG. 1 illustrates a diagram of a gasification device.
Figure 2:
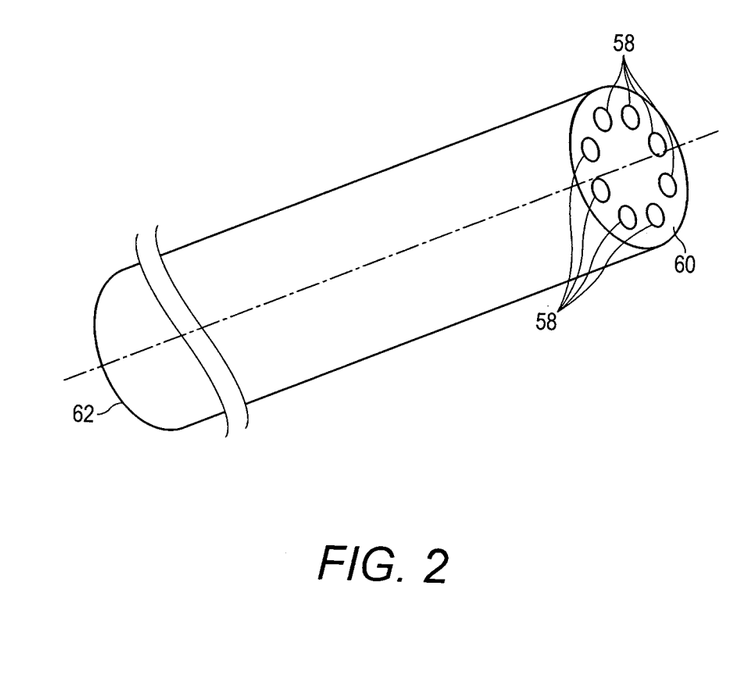
FIG. 2 illustrates a burner of the gasification device.

FIGS. 1 and 2 provide an embodiment of the present invention. In particular, FIG. 1 illustrates the diagram of the gasification device 20. The gasification device 20 comprises a reactor 22, an HHO gas generator 24, a hydrogen gas circulation loop 26, a pressurized gas loop 28 and an organic feeder 30.

The reactor 22 further comprises a burner 32, a torch 34, a slag collector 36 and a shell 38. The shell 38 forms an enclosed chamber 40 which is hermetic. At a lateral side 42 of the reactor 22, the burner 32 is placed above the torch 34 with close proximity such that flames 44 of the torch 34 can spread over an exterior surface 46 of the burner 32 when in use. In a longitudinal direction, at a bottom side 48 of the reactor 22, the slag collector 36 has an inverted cone shape such that a wider opening 50 of the slag collector 36 opens towards top, whilst a narrower opening 52 of the slag collector 36 points downwards. A side opening 54 is connected to the wider opening 50 for discharging slag 56 from the slag collector 36. On a top side 57 of the reactor 22, a gas discharge opening 59 is connected to a valve (not shown), opposite to the bottom side 48.

FIG. 2 illustrates the burner 32 of the gasification device 20. The burner 32 has a cylindrical shape and is made of tungsten material having a melting point of −3,422° C. In a longitudinal direction of the burner 32 (see cylindrical axis), there are parallel cylindrical tunnels 58 evenly distributed over a cross-section of the burner 32. The diameter of the burner 32 is about 10 millimeters (mm), whilst each of the cylindrical tunnels 58 has a diameter of 0.5 millimeters (mm). The cylindrical tunnels 58 open at a front end 60 of the burner 32 inside the reactor 22, and connect to the feedstock feeder 30 at a back end 62. The burner 32 is inserted into the reactor 22 on the shell 38.

Referring back to FIG. 1, in contrast to the torch 34, the burner 32 of the reactor 22 is connected to the feedstock feeder 30. The feedstock feeder 30 has a slurry tank 88 filled with an organic mixture 90, a feeding tube 92, a feeding pump (not shown), a feeding valve 93 and a regulator 95. The feeding tube 92 joins a bottom side of the slurry tank 88 to the back end 62 of the burner 32. The feedstock mixture 90 contains green waste, food waste, paper waste, and biodegradable plastics that are in a liquid or semi-solid form (e.g. slurry). The feeding valve 93 is connected to the regulator 95 for controlling flow rates of the organic mixture 90. The regulator 95 is further connected to a temperature sensor 97 on the reactor 22 for controlling reaction rates of the gasification device 20. Pressure sensors 101 on the pressurized gas loop 28 is further connected to the regulator 95 for process control and monitoring.

In the reactor 22, the torch 34 provides a heat and ignition source that can cause the organic mixture 90, which exits front end 60 of the burner 32. The flame 44 of the torch 34 can raise temperature of the burner 32 to be more than 2,200° C. such that it can catalyze/disassociate the organic mixture 90 into synthetic gas (syngas) 91 and solid waste (slag) 56. The synthetic gas 91 includes CO, $H_2$, CH, etc. The burner 32 is an electrically conductive material especially those at high temperature that is raised to a high temperature under the flame 44 of the ionized gas (oxyhydrogen gas or HHO gas). The burner 32 further provides conduits 58 for providing an energy source (fuel or feedstock) of the reactor 22. The shell 38 forms an enclosed chamber 40 such that heat from the burner 32 and the torch 34 is preserved and removed only by the carbon dioxide fluid 116. The slag collector 36 collects solid waste at bottom. Excess liquid (e.g. water) of the reactor 22 can be discharged via the narrower opening 52 below.

According to FIG. 1, the HHO gas generator 24 comprises a Direct Current (DC) power supply 64, an anode 66, a cathode 68, a concealed water tank 70 partially filled with a potassium hydroxide (KOH) solution 72, and two orifice 74, 76 and a liquid pump 84. The anode 66 and the cathode 68 are connected to opposite ends of the DC power supply 64, and they 66, 68 are partially immersed inside the potassium hydroxide solution 72. The potassium hydroxide solution 72 in a liquid form fills a lower portion of the water tank 70, whilst an upper portion of the water tank 70 is filled with HHO gas 78. The HHO gas 78 differs from a mixture of oxygen and hydrogen gases by having hydrogen and oxygen gases charged with ions (i.e. ionized hydrogen and oxygen gases). A liquid orifice 74 of the HHO gas generator 24 is covered by the potassium hydroxide solution 72, whilst a gas orifice 76 of the HHO gas generator 24 is exposed above the potassium hydroxide solution 72, and is located on top of the liquid orifice 74. The gas orifice 76 is connected to the torch 34 via a tube 82 and a non-return valve 83, whilst the liquid orifice 74 is connected to the narrower opening 52 of the slag collector 36. The liquid pump 84 is mounted on another tube 86 that connects the liquid orifice 74 and the narrower opening 52 of the reactor 22.

The hydrogen gas circulation loop 26 includes a gas separator 94, a hydrogen upstream tube 96, a hydrogen burning chamber 98 and a hydrogen downstream tube 100, which are sequentially connected. Moreover, an inlet 102 of the gas separator 94, which is located at a bottom side of the gas separator 94, is linked to the gas discharge opening 59. The inlet 102, which is also an exhaust of the reactor 22, has a discharging valve 103 for controlling gas flow rates between the reactor 22 and the gas separator 94. The hydrogen downstream tube 100 is further connected to the narrower opening 52. A hydrogen torch 104 is interconnected to an exit 106 of the hydrogen upstream tube 96 and inserted into the hydrogen burning chamber 98. The gas separator 94 further has a vent 108 on its top side and is connected to an interior of the gas separator 94.

In the hydrogen gas circulation loop 26, the gas separator 94 separates the synthetic gas 91 from the reactor 22 such that hydrogen gas 99 is diverted into the hydrogen upstream tube 96, whilst remaining gases are discharged via the vent 108 for further processing. The hydrogen torch 104 can incinerate the hydrogen gas 99 for generating heat. The oxygen gas is provided from ambient automatically.

The pressurized gas loop 28 has a copper pipe 110, a turbine 112 with a pressure regulator 113 and a compressor 114 connected in series. Carbon dioxide fluid 116 fills all of these three components 110, 112, 113, 114. The copper pipe 110 has a reactor portion 118 and a heating portion 120 serially connected to the turbine 112. In particular, the reactor portion 118 is inserted into the reactor 22 hermetically and exposed inside the chamber 40. The heating portion 120 penetrates through the hydrogen burning chamber 98 air tightly. Both the reactor portion 118 and the heating portion 120 have radial fins (not shown) on their external surfaces for facilitating heat exchange.

In the pressurized gas loop 28, the turbine 112 serves a pressure-to-movement device that can receive the carbon dioxide fluid 116 of higher pressure at its inlet 122 to rotary motion and discharge the carbon dioxide fluid 116 of lower pressure at its outlet 124. In contrast, the compressor 114 propels and pressurizes the carbon dioxide fluid 116 that leaves the turbine 112. In other words, the compressor 114 can convert the carbon dioxide fluid 116 from gas phase to liquid phase. In contrast, the carbon dioxide of liquid phase can be converted from liquid phase to gas phase after passing through the reactor portion 118.

When in use, the DC power supply 64 discharges electric current to the potassium hydroxide solution 72 via both the anode 66 and the cathode 68. Electrically charged hydrogen and oxygen gases 78 (HHO gas) form bubbles on surfaces the electrodes 66, 68. The HHO gas 78 has ions 80 and is highly inflammable. Since the HHO gas generator 24 is hermetically concealed, the HHO gas 78 leaves the HHO gas 78 via the gas orifice 76 and enters the torch 34. The HHO gas 78 is ignited by a piezo igniter element (not shown) at an outlet of the torch 34 such that the flame 44 wraps around and touches the burner 32 substantially. The piezo igniter element may be replaced by a spark plug.

The burner 32 is raised to be more than 2,200° C. under the flame 44. In the meantime, the organic mixture 90 in the slurry form is propelled by a pump (not shown) from the slurry tank 88 to the burner 32 via the back end 62. The organic mixture 90 cools the burner 32 when passing through the cylindrical tunnels 58. At the front end 30, the organic mixture 90 is disassociated into constituent elements such that the organic mixture 90 is converted into the synthetic gas 91 and the slag 56. The slag 56 is formed by inorganic materials, such as scrap metals and construction waste. In the reactor 22, the slag 56 is accumulated at the slag collector 36 and discharged through side opening 54. In contrast, the synthetic gas 91 departs from the reactor 22 and enters into the gas separator 94.

In the gas separator 94, the synthetic gas 91 is separated such that the hydrogen gas 99 goes into the hydrogen upstream tube 96, whilst the remaining gases escape from the gas separator 94 from the vent 108. The remaining gases (e.g. CO & CH) are collected by a boiler (not shown) for converting into useful energy or motion.

The hydrogen gas 99 travels from the gas separator 94 to the hydrogen torch 104 via the hydrogen upstream tube 96. The hydrogen gas 99 is burnt at the hydrogen torch 104 for heating the fins (not shown) of the hydrogen upstream tube 96. As a result, the hydrogen gas 99 reacts with oxygen gas taken from the ambient and is converted into water 126 in liquid or vapor form. The water 126 is further condensed or cooled down by the ambient when moving through the hydrogen downstream tube 100. The discharged water 126 is driven either into the water tank 70, or out of the gasification device 20. Water 126, which is formed inside the chamber 40 is also propelled either into the water tank 70, or out of the gasification device 20.

In the process of forming the synthetic gas 91, the carbon dioxide fluid 116 is circulated around the pressurized gas loop 28. In detail, the carbon dioxide fluid 116 in a liquid form is heated up by the atmospheric ambient temperature before the check valve 111 prior to entering the chamber 40 and further heated in the chamber 40 of the reactor portion 118 and evaporated into a gas form. The carbon dioxide 116 in the gas form moves out of the reactor portion 118 and is further heated by the hydrogen torch 104, with increase in pressure. The carbon dioxide gas 116 of high pressure pushes blades/rotor (not shown) of the turbine 112 to rotate for generating electricity and/or mechanical motion. The pressure regulator 113 controls the carbon dioxide pressure to the turbine 112 for speed and power regulation. In automatic function, regulator 95 controls pressure regulator with other sensors feedback. An electricity converter 128 is connected to the turbine 112 for receiving energy input and providing electricity for supplying the DC power supply 64. In the meantime, the turbine 112 can be connected to a gearbox (not shown) of a vehicle 130 for transportation.

In the gasification device 20, the turbine 112 can alternatively be replaced by a piston pump when dealing with high pressure. The piston pump can still provide mechanical motion for generating the electricity and a drivetrain of the vehicle. In the HHO gas generator 24, the DC power supply 64 can either provide stable direct current discharge or pulsating direct current discharge for generating the HHO gas 78. potassium hydroxide solution 72 may be replaced by water free from potassium hydroxide, such as tap water. The feedstock feeder 30 can include a grinder such that organic feeding stocks (e.g. municipal solid waste, organic waste) may be pulverized for feeding through the cylindrical tunnels 58 smoothly. The gasification device 20 can also perform pyrolysis process for decomposing organic material at elevated temperatures without the participation of oxygen, such that the gasification device 20 may be alternatively known as a pyrolysis device. The gasification device 20 can also be used as a reformer for other chemical process.

Figure 3:
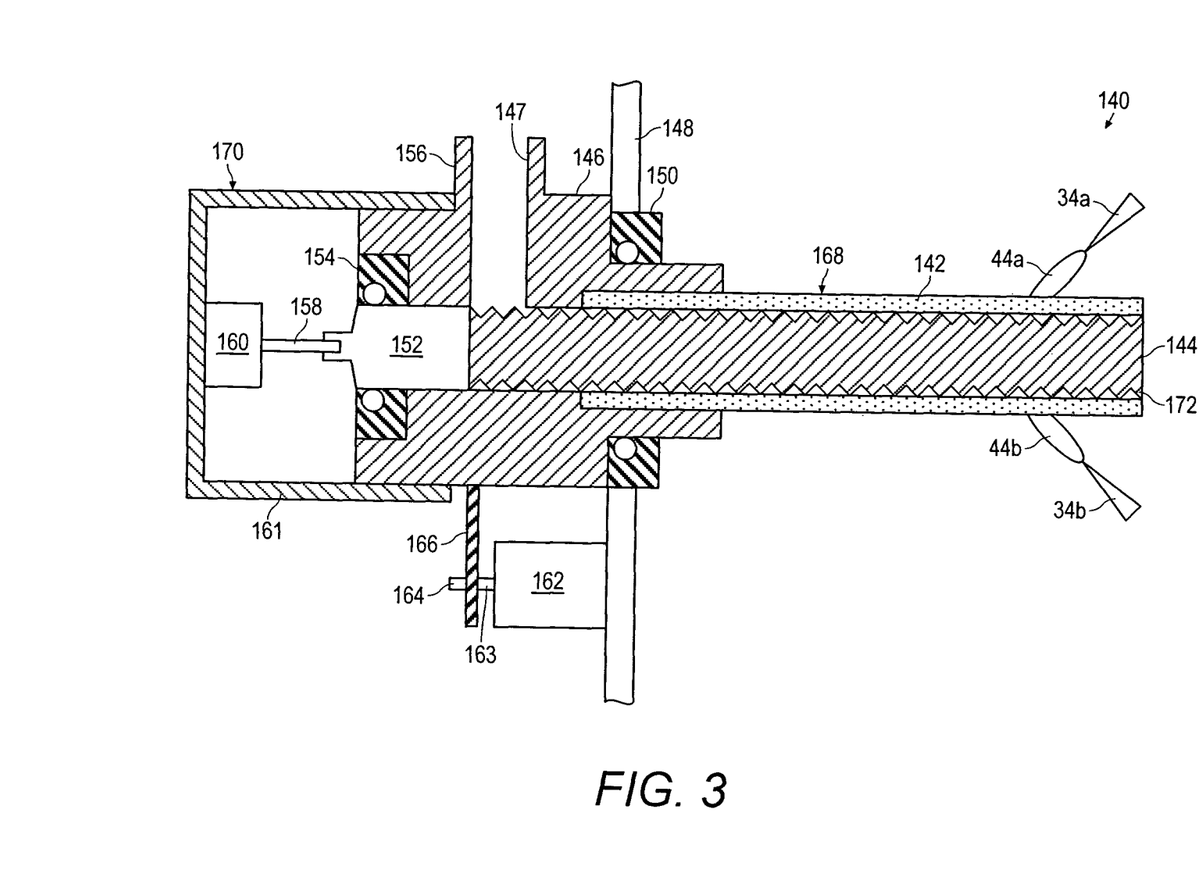
FIG. 3 illustrates an alternative burner of the gasification device.

FIG. 3 provides another embodiment of the invention. FIG. 3 shows parts that have reference numerals similar or identical to those of FIGS. 1 and 2. Description of the corresponding parts is therefore incorporated by reference.

In particular, FIG. 3 illustrates an alternative burner 140 of the gasification device 20. The alternative burner 140 has an Archimedean screw feeder 168 and a feedstock propeller 170 that are coupled together.

The Archimedean screw feeder 168 further comprises a feeding sleeve 142, a feeding screw 144, a screw holder 146, a wall bracket 148 and a wall bracket bearing 150. The feeding screw 144 is contiguously inserted into the feeding sleeve 142, whilst the feeding sleeve 142 is snugly slotted inside an opening on the wall bracket 148. The feeding sleeve 142 is cylindrical and made of silicon carbide (SiC) material. The wall bracket bearing 150 is tightly held between the wall bracket 148 and the screw holder 146 such that the wall bracket 148 and the screw holder 146 can rotate with respect to each other around a rotary axis of the wall bracket bearing 150.

The feedstock propeller 170 further comprises a screw handle 152, a screw bearing 154, a motor bracket 156, a screw joint 158, a feeding motor 160, a (feeding) motor casing 161, a roll motor 162, a driving gear 164 and a driven gear 166. The screw handle 152 is attached to an end of the feeding screw 144 and a shaft of the feeding motor 160. The screw bearing 154 is firmly seized between the motor bracket 156 and the screw handle 152. Both the motor bracket 156 and the feeding motor 160 are enclosed by and affixed to the motor casing 161. The roll motor 162 is attached to the wall bracket 148. The roll motor 162 includes a motor shaft 163, which is inserted into the driving gear 164. In contrast, the driven gear 166 is fixed onto the screw holder 146, whilst the driving gear 164 meshes with the driven gear 166.

When in use, the organic mixture 90 is poured into a receptacle 147 of the screw holder 146. Since the feeding motor 160 causes the feeding screw 144 to rotate via the screw joint 158 and the screw handle 152, the organic mixture 90 is squeezed by threads 149 of the feeding screw 144 and moves forward towards a discharge opening 172 of the Archimedean screw feeder 168. In the meantime, the feeding sleeve 142 rotates continuously clockwise and anti-clockwise (back and forth), whilst the feeding sleeve 142 is rolled continuously by the roll motor 162. In a feeding process, the organic mixture 90 is propelled between neighboring teeth of the feeding screw 144 and ejected out of the discharge opening 172. Since the flames 44a, 44b touch the feeding sleeve 142 and raise its temperature to above 2,200° C., the organic mixture 90 is decomposed under the high temperature in forming the synthetic gas 91 or reformed compound in the reactor 22, which are basic forms of materials made of fundamental constituent elements/molecules. Both the feeding motor 160 and the roll motor 162 are connected to control unit (not shown) of the reactor 22 such that the rotation range and speed of these motors 160, 162 are precisely regulated. When rotating, the wall bracket bearing 150 and the screw bearing 154 provide stable support to parts of the burner 140 for operation under high temperature. Rotary torque of the feeding sleeve 142 is provided from the roll motor 162, via the motor shaft 163, via the driving gear 164, via the driven gear 166, via the motor bracket 156, to the feeding sleeve 142. In contrast, rotary torque of the feeding screw 144 is transmitted from the feeding motor 160, via the screw joint 158, via the screw handle 152, to the feeding screw 144.

In the alternative burner 140, the meshing between the gears 164, 166 may be replaced by friction engagement between mechanical parts or a chain drive. The silicon carbide may also be replaced by other materials that can withstand extreme high temperature.

In the application, unless specified otherwise, the terms "comprising", "comprise", and grammatical variants thereof, intended to represent "open" or "inclusive" language such that they include recited elements but also permit inclusion of additional, non-explicitly recited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. The description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A reactor for disassociating a feedstock material into at least one gas, the reactor comprising:
   a heating device for discharging an ionized gas into the reactor;
   a feedstock feeder for injecting the feedstock material into the reactor; and
   a shell housing enclosing a part of the heating device and a portion of the feedstock feeder, the shell housing forming an enclosed chamber;
   wherein the heating device is configured to be kept electrically neutral for disassociating the feedstock material into the at least one gas.

2. The reactor of claim 1, wherein the feedstock feeder comprises a burner inserted into the chamber, with at least a portion of the burner being made of a material that withstands a high temperature.

3. The reactor of claim 2, wherein the burner comprises a plurality of internal channels for feeding the feedstock material into the chamber.

4. The reactor of claim 2, wherein at least a component of the burner is adjacent to the heating device such that flames of the at least one gas is configured to touch the burner for disassociating the feedstock material.

5. The reactor of claim 2, wherein the burner further comprises an Archimedean screw feeder and a feedstock propeller coupled together for injecting the feedstock material into the reactor.

6. The reactor of claim 5, wherein the Archimedean screw feeder comprises a feeding screw fitted inside a feeding sleeve for propelling the feedstock material between a plurality of teeth of the feeding screw, or a plurality of teeth of the feeding sleeve or both.

7. The reactor of claim 5, wherein the Archimedean screw feeder and the feedstock propeller are supported on a wall bracket bearing and a screw bearing for rotating the feeding sleeve, the feeding screw, or both.

8. The reactor of claim 1, wherein the shell housing includes a heat exchanger that is connected to a portion of the shell housing for cooling the shell housing.

9. The reactor of claim 1, further comprising slag collector for collecting and disposing of a solid waste.

10. The reactor of claim 1, wherein the shell seals the enclosed chamber such that the reactor is capable of operating at a negative pressure or a positive pressure.

11. The reactor of claim 1, further comprising a regulator connected to the heating device and an inlet for controlling a molecular disassociation process in the chamber.

12. The reactor of claim 11, wherein the regulator is connected to a temperature sensor inside the chamber for monitoring an internal temperature of the reactor.

13. The reactor of claim 11, wherein the regulator is connected to a feeding valve on a feeding tube of the feedstock feeder for adjusting a flow rate of the feedstock material.

14. The reactor of claim 11, wherein the regulator is connected to a discharging valve located on the inlet for governing a flow rate of the at least one gas.

15. A gasification device, comprising:
   a reactor for disassociating a feedstock material into at least two gases, the reactor including a heating device for discharging an ionized gas into the reactor;
   a gas generator connected to the heating device for gasification, the gas generator comprising a water tank, the water tank comprising a liquid orifice for receiving a water in a liquid or a gas form, and a gas orifice for releasing an ionized gas; and
   a hydrogen gas circulation loop for receiving, collecting and or converting the at least one gas into heat, water, or both, with the hydrogen gas circulation loop comprising a gas separator connected to the reactor for separating the at least two gases.

16. The gasification device of claim 15, wherein the gas generator further comprises a power supply for supplying electric current to an anode and a cathode in the water tank.

17. The gasification device of claim 15, wherein the hydrogen gas circulation loop further comprises a hydrogen torch, the hydrogen torch being connected to a hydrogen upstream tube on the gas separator for heating a heating portion of the pressurized gas loop.

18. The gasification device of claim 15, wherein the hydrogen gas circulation loop further comprises a liquid pump connected to a hydrogen burning chamber of the hydrogen gas circulation loop for circulating water to the water tank.

19. A method for converting a feedstock material into at least two synthetic gases, the method comprising the steps of:
   providing the feedstock material to a burner located in a reactor;
   supplying at least one ionized gas into the reactor; and
   subjecting the burner to a flame of the at least one ionized gas such that molecules of the feedstock material are dissociated and form the at least two synthetic gases.

20. The method of claim 19, wherein the step of providing the feedstock material comprises pulverizing the feedstock material into a powder or a fluid for feeding through at least one channel located inside the burner.

21. The method of claim 19, wherein the step of providing the feedstock material comprises squeezing the feedstock material through at least one channel located inside the burner.

22. The method of claim 19, wherein the step of supplying the at least one ionized gas comprises delivering a direct electric current through an ionic substance via an anode and a cathode.

23. The method of claim 19, wherein the step of supplying the at least one ionized gas further comprises igniting the at least one ionized gas for generating a flame above 600° C.

24. The method of claim 19, wherein the step of supplying the at least one ionized gas further comprises causing the flame to touch the burner for heating up the feedstock material.

25. The method of claim 19, wherein the step of providing the feedstock material comprises propelling the feedstock material between a plurality of teeth of an Archimedean screw feeder.

26. The method of claim 19, wherein the step of subjecting the burner to the flame comprises shifting a feeding sleeve of an Archimedean screw feeder under the flame.

* * * * *